US012399450B2

(12) United States Patent
Sato

(10) Patent No.: US 12,399,450 B2
(45) Date of Patent: Aug. 26, 2025

(54) TONER CARTRIDGE

(71) Applicants: Toshiba Tec Kabushiki Kaisha, Tokyo (JP); Toshiba America Business Solutions, Inc., Lake Forest, CA (US)

(72) Inventor: Tsutomu Sato, Izunokuni (JP)

(73) Assignees: Toshiba Tec Kabushiki Kaisha, Tokyo (JP); Toshiba America Business Solutions, Inc., Lake Forest, CA (US)

( * ) Notice: Subject to any disclaimer, the term of this patent is extended or adjusted under 35 U.S.C. 154(b) by 31 days.

(21) Appl. No.: 18/486,669

(22) Filed: Oct. 13, 2023

(65) Prior Publication Data

US 2024/0036498 A1 Feb. 1, 2024

Related U.S. Application Data

(63) Continuation of application No. 17/542,529, filed on Dec. 6, 2021, now Pat. No. 11,822,266, which is a (Continued)

(30) Foreign Application Priority Data

May 18, 2006 (JP) ................................ 2006-139188
May 18, 2006 (JP) ................................ 2006-139189

(51) Int. Cl.
*G03G 15/08* (2006.01)
*G03G 21/16* (2006.01)

(52) U.S. Cl.
CPC ..... *G03G 15/0889* (2013.01); *G03G 15/0863* (2013.01); *G03G 15/0865* (2013.01);
(Continued)

(58) Field of Classification Search
CPC ........... G03G 15/0889; G03G 15/0863; G03G 15/0865; G03G 15/087; G03G 15/0875;
(Continued)

(56) References Cited

U.S. PATENT DOCUMENTS 4,740,808 A 4/1988 Kasamura et al.
4,977,429 A 12/1990 Tani et al.
(Continued)

FOREIGN PATENT DOCUMENTS

CN 2718626 Y 8/2005
JP 2001255728 A 9/2001
(Continued)

OTHER PUBLICATIONS

U.S. Office Action mailed Aug. 14, 2009 corresponding to U.S. Appl. No. 11/749,276, filed May 16, 2007.
(Continued)

*Primary Examiner* — Rodney A Bonnette
(74) *Attorney, Agent, or Firm* — Kim & Stewart LLP

(57) ABSTRACT

A toner cartridge comprises a toner container which contains toner, a driving member which rotationally drives a conveying member, an agitating member which agitates a toner in the toner container while being rotated, a driven member which rotates in association with the driving member which is for rotationally driving the agitating member, and a rotational body which rotates according to rotation of the driven member, has a plurality of slits in rotational circumference for identifying a type of the toner cartridge, and has 1/K or more of the slits when a ratio of a rotational speed R1 (rad/s) of the driving member and a rotational speed R2 (rad/s) of the driven member is K=R2/R1.

12 Claims, 10 Drawing Sheets

Related U.S. Application Data continuation of application No. 16/526,037, filed on Jul. 30, 2019, now Pat. No. 11,199,792, which is a continuation of application No. 16/011,981, filed on Jun. 19, 2018, now Pat. No. 10,386,752, which is a continuation of application No. 15/404,583, filed on Jan. 12, 2017, now Pat. No. 10,007,211, which is a continuation of application No. 14/748,528, filed on Jun. 24, 2015, now Pat. No. 9,581,938, which is a continuation of application No. 14/247,474, filed on Apr. 8, 2014, now Pat. No. 9,098,015, which is a continuation of application No. 14/076,591, filed on Nov. 11, 2013, now Pat. No. 8,712,259, which is a continuation of application No. 13/898,681, filed on May 21, 2013, now Pat. No. 8,606,124, which is a continuation of application No. 13/650,620, filed on Oct. 12, 2012, now Pat. No. 8,472,815, which is a continuation of application No. 13/273,567, filed on Oct. 14, 2011, now Pat. No. 8,311,420, which is a continuation of application No. 12/850,794, filed on Aug. 5, 2010, now Pat. No. 8,150,275, which is a continuation of application No. 11/749,276, filed on May 16, 2007, now Pat. No. 7,792,438.

(52) U.S. Cl.
CPC ....... *G03G 15/087* (2013.01); *G03G 15/0875* (2013.01); *G03G 15/0877* (2013.01); *G03G 21/1647* (2013.01); *G03G 21/1676* (2013.01); *G03G 2215/0695* (2013.01); *G03G 2221/163* (2013.01); *G03G 2221/1657* (2013.01)

(58) Field of Classification Search
CPC ........... G03G 15/0877; G03G 21/1647; G03G 21/1676; G03G 2215/0695; G03G 2221/163; G03G 2221/1657
See application file for complete search history.

(56) References Cited

U.S. PATENT DOCUMENTS

| | | | | |
|---|---|---|---|---|
| 5,890,036 | A | 3/1999 | Karakama et al. | |
| 5,940,658 | A | 8/1999 | Yokoi et al. | |
| D442,214 | S | 5/2001 | Hayashi | |
| D442,624 | S | 5/2001 | Maeshima | |
| D447,168 | S | 8/2001 | Nishimura | |
| 6,298,202 | B1 | 10/2001 | Fushiya et al. | |
| 6,397,015 | B2 | 5/2002 | Curry et al. | |
| 6,542,709 | B1 | 4/2003 | Wang et al. | |
| 6,687,478 | B2 | 2/2004 | Sugita et al. | |
| 7,003,233 | B2 | 2/2006 | Matsuda et al. | |
| 7,373,096 | B1 | 5/2008 | Miller | |
| 7,734,197 | B2 | 6/2010 | Sato | |
| 7,792,438 | B2 | 9/2010 | Sato | |
| 7,957,680 | B2 | 6/2011 | Sato | |
| 8,150,275 | B2 | 4/2012 | Sato | |
| 8,311,420 | B2 | 11/2012 | Sato | |
| 8,712,259 | B2 | 4/2014 | Sato | |
| 9,098,015 | B2 | 8/2015 | Sato | |
| 9,298,134 | B2 * | 3/2016 | Okubo | G03G 15/0886 |
| 9,581,938 | B2 | 2/2017 | Sato | |
| 2002/0085857 | A1 | 7/2002 | Kim et al. | |
| 2003/0063927 | A1 | 4/2003 | Wang et al. | |
| 2005/0063733 | A1 | 3/2005 | Jeon | |
| 2007/0122203 | A1 | 5/2007 | Sugimoto et al. | |
| 2007/0269224 | A1 | 11/2007 | Sato | |
| 2007/0269225 | A1 | 11/2007 | Sato | |
| 2008/0170887 | A1 | 7/2008 | Nishimura et al. | |
| 2008/0170888 | A1 | 7/2008 | Eto et al. | |
| 2008/0175629 | A1 | 7/2008 | Eto et al. | |
| 2010/0322641 | A1 | 12/2010 | Sato | |
| 2011/0280623 | A1 | 11/2011 | Heo et al. | |

FOREIGN PATENT DOCUMENTS

| | | | |
|---|---|---|---|
| JP | 2002006610 | A | 1/2002 |
| JP | 2002244534 | A | 8/2002 |
| JP | 2003050505 | A | 2/2003 |
| JP | 2004264460 | A | 9/2004 |
| JP | 2005099434 | A | 4/2005 |
| JP | 2006030303 | A | 2/2006 |
| JP | 2006091032 | A | 4/2006 |

OTHER PUBLICATIONS

U.S. Office Action mailed Dec. 14, 2009 corresponding to U.S. Appl. No. 11/749,276, filed May 16, 2007.
Chinese Office Action dated Sep. 21, 2008 corresponding to U.S. Appl. No. 11/749,276, filed May 16, 2007.
Japanese Office Action for Application No. 2006-139189 mailed on Sep. 6, 2011.
Japanese Office Action for Application No. 2006-139189 mailed on Jun. 21, 2011.
Japanese Office Action for Application No. 2006-139188 mailed on Jun. 28, 2011.
U.S. Office Action mailed Nov. 16, 2010 corresponding to U.S. Appl. No. 12/850,794, filed Aug. 5, 2010.
Japanese Office Action for Japanese Application No. 2012-108465 mailed on Aug. 21, 2012.
Japanese Office Action for Japanese Application No. 2012-8508 mailed on Aug. 21, 2012.
U.S. Office Action mailed Mar. 15, 2012 corresponding to U.S. Appl. No. 13/273,567, filed Oct. 14, 2011.
U.S. Office Action mailed Dec. 9, 2014 corresponding to U.S. Appl. No. 14/247,474.
*IPR Decision, Katun Corporation* (Petitioner) v. *Toshiba TEC Corporation and Toshiba America Business Solutions, Inc.* (Patent Owner), Case IPR2016-01010, Patent 9,098,015 B2, Entered Nov. 16, 2016, pp. 1-22.
Office Action mailed Jun. 3, 2019 in U.S. Appl. No. 15/586,863, 9 pages.

* cited by examiner

TONER CARTRIDGE

CROSS-REFERENCE TO RELATED APPLICATIONS

This application is a Continuation of application Ser. No. 17/542,529 filed on Dec. 6, 2021, which is a Continuation of application Ser. No. 16/526,037 filed on Jul. 30, 2019, now U.S. Pat. No. 11,199,792, issued on Dec. 14, 2021, which is a Continuation of application Ser. No. 16/011,981 filed on Jun. 19, 2018, now U.S. Pat. No. 10,386,752, issued on Aug. 20, 2019, which is a Continuation of application Ser. No. 15/404,583 filed on Jan. 12, 2017, now U.S. Pat. No. 10,007,211, issued on Jun. 26, 2018, which is a Continuation of application Ser. No. 14/748,528 filed on Jun. 24, 2015, now U.S. Pat. No. 9,581,938, issued on Feb. 28, 2017, which is a Continuation of application Ser. No. 14/247,474 filed Apr. 8, 2014, now U.S. Pat. No. 9,098,015, issued on Aug. 4, 2015, which is a Continuation of application Ser. No. 14/076,591 filed Nov. 11, 2013, now U.S. Pat. No. 8,712,259, issued on Apr. 29, 2014, which is a Continuation of application Ser. No. 13/898,681 filed May 21, 2013, now U.S. Pat. No. 8,606,124, issued on Dec. 10, 2013, which is a Continuation of application Ser. No. 13/650,620 filed Oct. 12, 2012, now U.S. Pat. No. 8,472,815, issued on Jun. 25, 2013, which is a Continuation of application Ser. No. 13/273,567 filed Oct. 14, 2011, now U.S. Pat. No. 8,311,420, issued on Nov. 13, 2012, which is Continuation of application Ser. No. 12/850,794 filed Aug. 5, 2010, now U.S. Pat. No. 8,150,275, issued on Apr. 3, 2012, which is a Continuation of application Ser. No. 11/749,276 filed May 16, 2007, now U.S. Pat. No. 7,792,438, issued on Sep. 7, 2010, which is based upon and claims the benefit of priority from prior Japanese Patent Applications No. 2006-139188, filed May 18, 2006; and No. 2006-139189, filed May 18, 2006, the entire contents of all of which are incorporated herein by reference.

BACKGROUND OF THE INVENTION

1. Field of the Invention

The present invention relates to a toner cartridge for supplying toner to an image forming apparatus.

2. Description of the Related Art

An image forming apparatus has a toner cartridge for supplying toner to the apparatus. The toner cartridge is inserted in the image forming apparatus in a removable manner. Also, the toner cartridge is configured such that the user can exchange the toner cartridge himself or herself when the toner cartridge is emptied of toner. In addition, a filling opening is provided in the toner cartridge and the toner is supplied through the filling opening. In the toner cartridge, a mixer is rotated constantly so as to prevent the toner from solidifying inside the toner cartridge.

In many cases, a manufacturer recommended product including a genuine product is set with respect to the toner cartridge such as above. This is because using a toner cartridge other than the recommended product is considered to cause a possible problem in the image forming apparatus. In a color image forming apparatus, the toner cartridge needs to be inserted in an appropriate position depending on a color of toner. For this reason, there is also an image forming apparatus which is configured so as to discriminate whether a inserted toner cartridge is recommended or not, and a type of the toner cartridge including a type of toner.

Jpn. Pat. Appln. Publication No. 2001-255728 discloses a slit disk which is provided at each toner cartridge and attached on an axis of a rotary shaft of a paddle, and in which slits are formed with specified intervals in a peripheral direction and slit intervals are mutually differently formed. A photosensor can detect the slit and detect a type of the toner cartridge from a detected signal.

U.S. Pat. No. 6,542,709 discloses a method of driving a paddle wherein a driving gear is arranged on one end of an auger for conveying toner, and a driven gear provided on one end of the paddle is rotated by the driving gear through an indirect gear.

In addition, Jpn. Pat. Appln. Publication No. 2004-264460 discloses a cartridge which has a paddle and an auger rotated by a driving gear, a driven gear, etc. provided on an external side of a toner cartridge.

However, when a slit is detected by rotating an axis of a paddle in which slits are formed as disclosed in Jpn. Pat. Appln. Publication No. 2001-255728, and when a rotary force of the paddle is a driven rotary force based on a rotation of an auger such as the one shown in U.S. Pat. No. 6,542,709, there is need to take into consideration a necessary rotation to ensure correct detection of the slit. However, a toner cartridge taking into consideration the above point does not exist, and this has resulted in detection in error.

When the inventors of the present invention attempted to have a toner cartridge having a gear on an external side of the cartridge optically detect the slit disclosed in Jpn. Pat. Appln. Publication No. 2001-255728, there occurred a problem that the gear entangles a variety of lead wires used for detection.

The present invention is invented in view of the above circumstances. An object of the present invention is to provide a toner cartridge which can correctly discriminate a type of the toner cartridge inserted in the image forming apparatus and a toner cartridge which does not interfere with optical detection carried out by the image forming apparatus.

BRIEF SUMMARY OF THE INVENTION

According to one aspect of the present invention, there is provided a toner cartridge comprising: a toner container which contains toner; a toner supplying opening which is formed in the toner container and supplies the toner to the image forming apparatus, a conveying member which conveys the toner toward the toner supplying opening in the toner container while being rotated; a driving member which rotationally drives the conveying member, an agitating member which agitates the toner in the toner container while being rotated, a driven member rotated in association with the driving member which is for rotationally driving the agitating member and a rotational body rotated according to rotation of the driven member, having a plurality of slits in rotational circumference, wherein the number of slits is 1/K or more of the slits when a ratio of a rotational speed R1 (rad/s) of the driving member and a rotational speed R2 (rad/s) of the driven member is K=R2/R1.

According to one aspect of the present invention, there is provided a toner cartridge comprising: a toner container which contains toner, a toner supplying opening which supplies the toner contained in the toner container to the image forming apparatus, an agitating member which agitates the toner contained in the toner container, a conveying member which conveys the toner contained in the toner container toward the supplying opening, one, two or more of gears which are provided on an exterior portion of the toner container and rotates the conveying member and the agitating member and a gear cover which covers circumference of the one, two or more of the gears.

DETAILED DESCRIPTION OF THE INVENTION

Hereinafter, a preferred embodiment for carrying out the present invention will be described.

Figure 1:
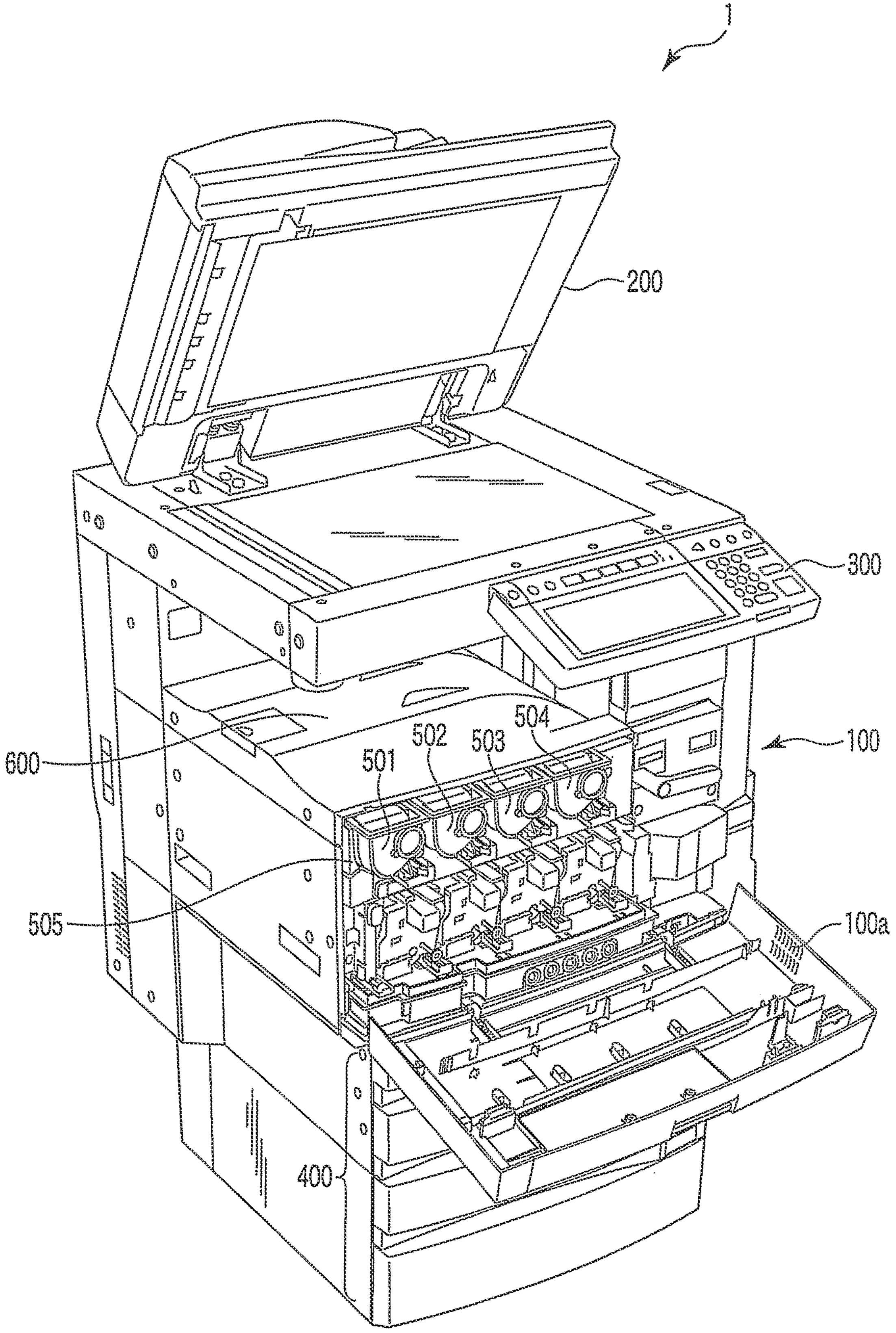
FIG. 1 is a schematic view showing an internal structure of an image forming apparatus according to one embodiment of the present invention.

FIG. 1 is a perspective view of a schematic view showing an internal structure of an image forming apparatus 1 according to an embodiment of the present invention. As shown in FIG. 1, the image forming apparatus 1 is a color copier of a quadruple tandem system. The image forming apparatus 1 includes a copier main body 100, a platen cover 200, a control panel 300, and a plurality of paper feeding cassettes 400.

The copier main body 100 plays a major role in image forming, and has a cover 100*a* provided on a front surface thereof in an openable and closable manner. When the cover 100*a* is opened, first to fourth toner cartridges 501 to 504 are found to be arranged in alignment on an upper portion side of the cover 100*a*. The platen cover 200 is provided on the copier main body 100 in an rotatable manner with one side edge as a rotational center. The control panel 300 is an input unit for copy operation and is provided on a top surface of the copier main body 100. The paper feeding cassette 400 is for containing paper and is provided on a lower side of the copier main body 100 in a removable manner. In addition, a paper delivering unit 600 is provided on top of a portion where the first to fourth toner cartridges 501 to 504 are provided.

Each of the first to fourth toner cartridges 501 to 504 is provided in a removable manner in a cartridge holding mechanism 505. The first to fourth toner cartridges 501 to 504 are for supplying toner of yellow, magenta, cyan, and black.

Next, a configuration of the first toner cartridge 501 will be described with reference to FIG. 2. Description of configurations of the second to fourth toner cartridges 502 to 504 will be omitted, since such configurations are almost same as the configuration of the first toner cartridge 501.

Figure 2:
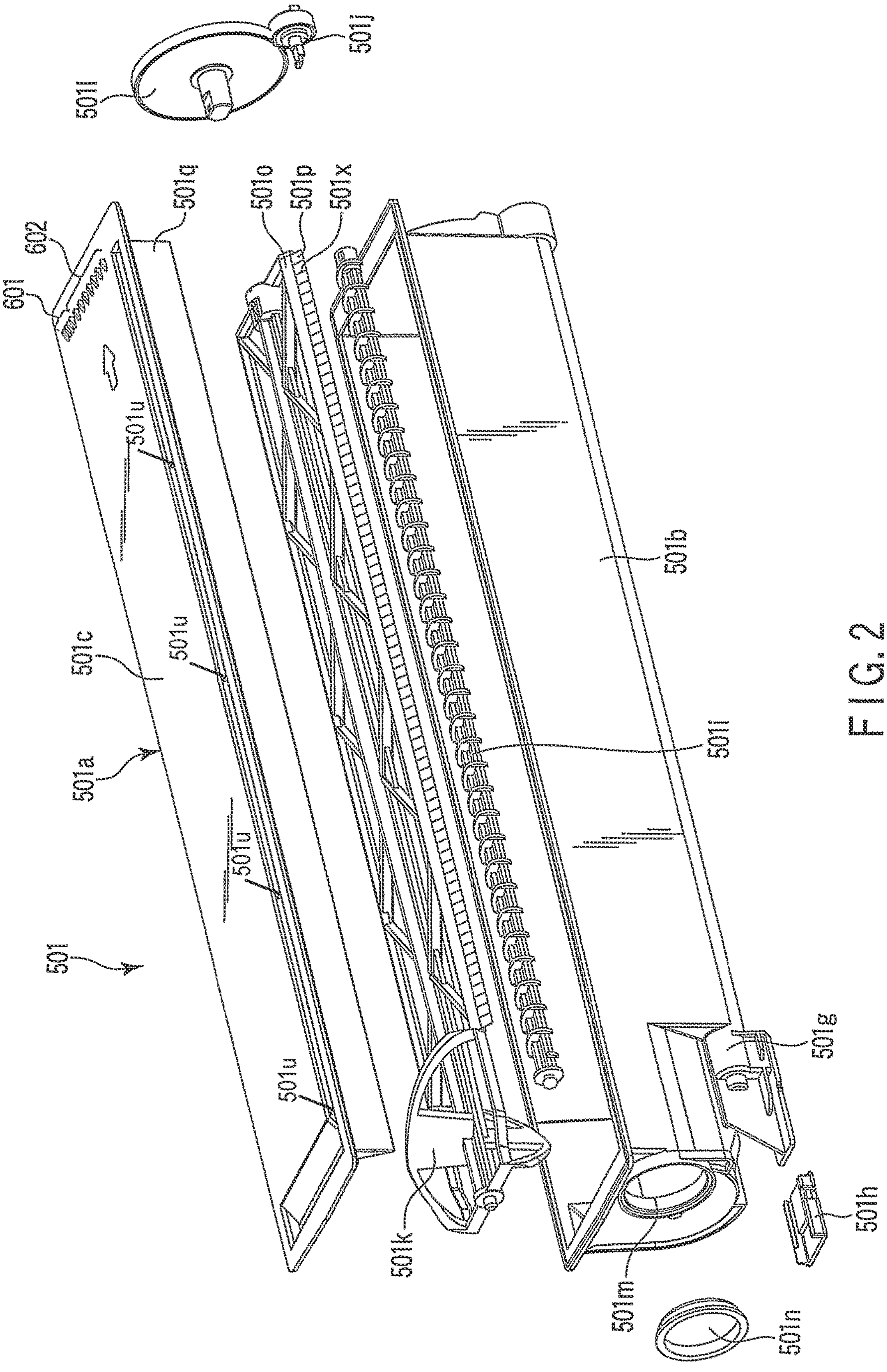
FIG. 2 is a perspective view showing a toner cartridge according to the embodiment as viewed from upper front side thereof.

FIG. 2 is a perspective view showing an entire configuration of the first toner cartridge 501 according to the present embodiment viewed from a front surface side. Here, a surface with a cap 501*n* of the first toner cartridge 501 is the front surface side, and a surface with a mixer gear 5011 is a rear side.

As shown in FIG. 2, the first toner cartridge 501 includes a cartridge main body 501*a* working as a toner container for containing the toner. The cartridge main body 501*a* is configured with a container body 501*b* and a lid body 501*c*. Also, first and second discriminating protrusion units 601 and 602 for discriminating toner information are provided on a rear side of the cartridge main body 501*a*.

The container body 501*b* has a U-shaped cross section. The lid body 501*c* has a rectangular plate shape. On a front surface side of the container body 501*b*, there is provided a discharging unit 501*g* which discharges the toner in the cartridge main body 501*a* and works as a toner supplying opening for supplying the toner in the image forming apparatus 1. The discharging unit 501*g* projects downwardly from a bottom surface of the container body 501*b*. On a bottom edge part of the discharging unit 501*g*, there is provided a shutter 501*h* for opening and closing a discharging opening (not shown) formed on the discharging unit 501*g*.

Figure 7:
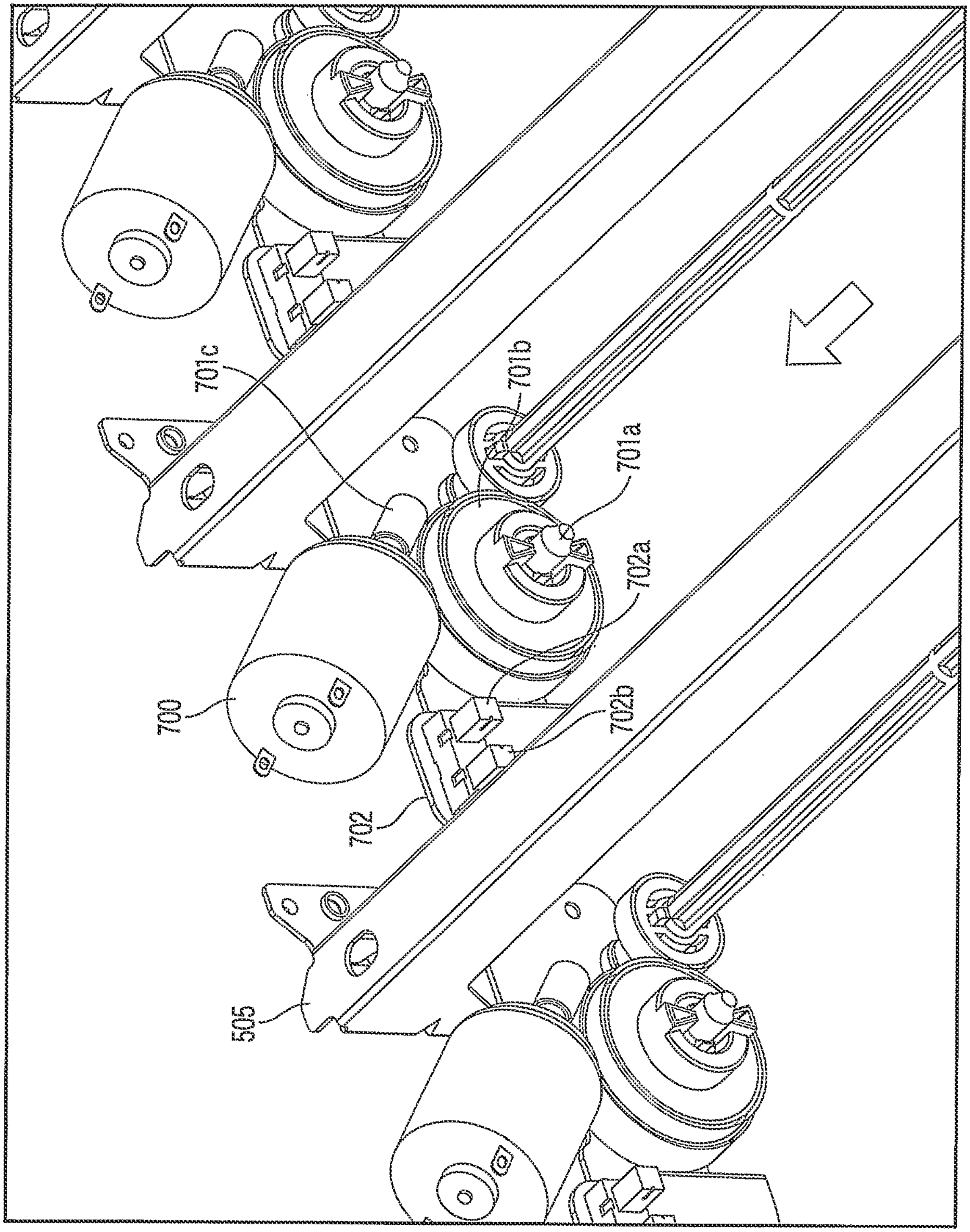
FIG. 7 is a perspective view of an inside of the image forming apparatus according to the embodiment as viewed from upper front side thereof.

At the inner bottom of the containing unit 501*b*, there is provided a screw 501*i* working as a conveying member for conveying the toner in the cartridge main body 501*a* to the discharging unit 501*g*. On an end part on a rear surface side of the screw 501*i*, there is provided a coupling member 501*j* working as a driving member. The coupling member 501*j* is connected to a driving apparatus 700 shown in FIG. 7 provided in the copier main body 100, and rotationally driven every time the toner is supplied.

Inside the cartridge main body 501*a*, there is provided a mixer 501*k* for agitating the toner in the cartridge main body 501*a*. At an end part on a rear surface of the mixer 501*k*, there is provided a mixer gear 5011. The mixer gear 5011 meshes with the coupling member 501*j* working as a gear provided in the screw 501*i*. When the screw 501*i* is rotated, the mixer gear 501*k* is configured to rotate in association therewith.

On a front surface side of the container body 501*b*, there is formed a filling opening 501*m* used for filling the toner in the cartridge main body 501*a*. The filling opening 501*m* has a circular shape, and is sealed with the cap 501*n*.

Figure 3:
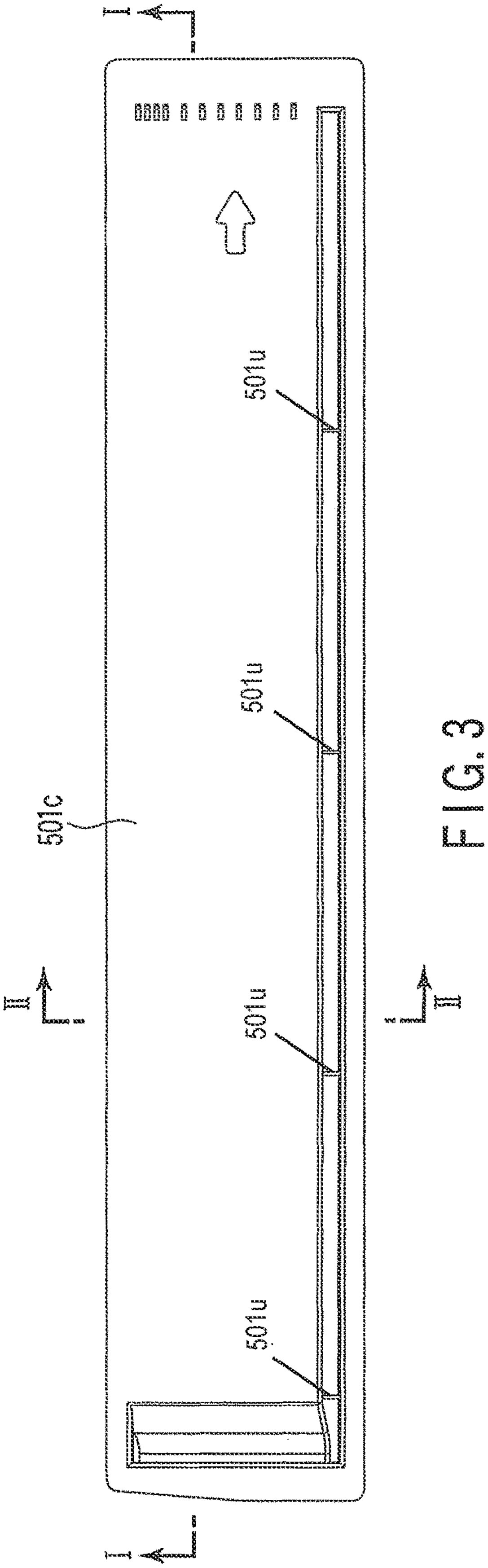
FIG. 3 is a plan view showing the toner cartridge according to the embodiment as viewed from above.
Figure 4:
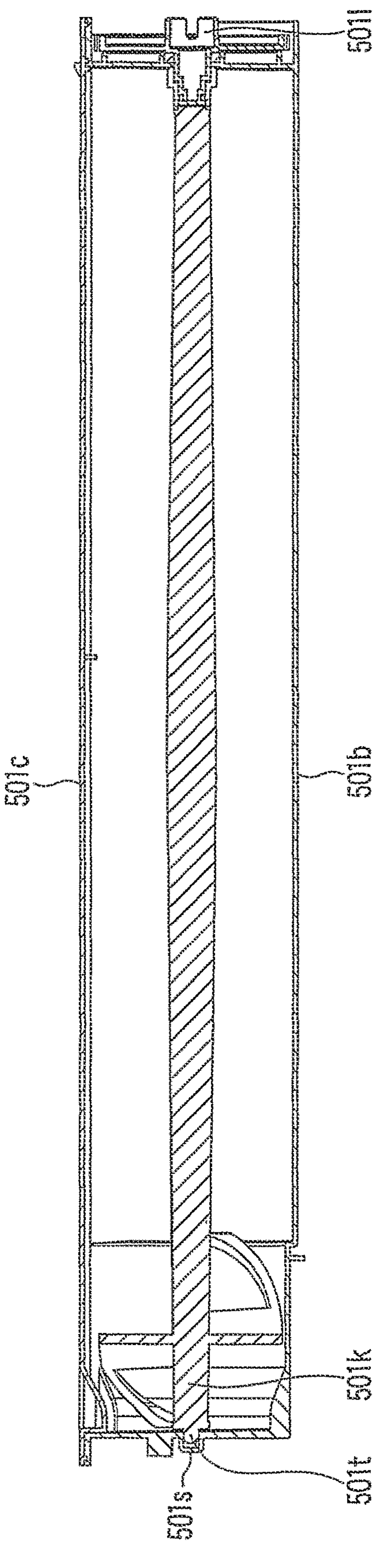
FIG. 4 is a transverse cross-sectional view showing an internal structure of the toner cartridge according to the embodiment.

FIG. 3 is a view of the first toner cartridge 501 viewed from above a top surface. In addition, FIG. 4 shows a cross-sectional view of the first toner cartridge 501 cut along the line I-I in FIG. 3. The mixer 501*k* is fixed as described below. On a rear side surface of the first toner cartridge 501, the mixer 501*k* connects with the mixer gear 5011 with a coupling unit interposed therebetween. In addition, on a front surface side of the first toner cartridge 501, the mixer

501*k* has a convex part 501*t* formed in a convex shape at an end part, and fits in a concave part 501*s* provided on a front surface side of the container body.

Here, an inner diameter of the concave part 501*s* is little larger than an outer diameter of the convex part 501*t*. For this reason, when the mixer 501*k* rotates to agitate the toner, the toner enters into a little gap between the convex part 501*t* and the concave part 501*s*. In this manner, friction between the convex part 501*t* and the concave part 501*s* is reduced, and the mixer 501*k* can rotate smoothly.

Figure 5:
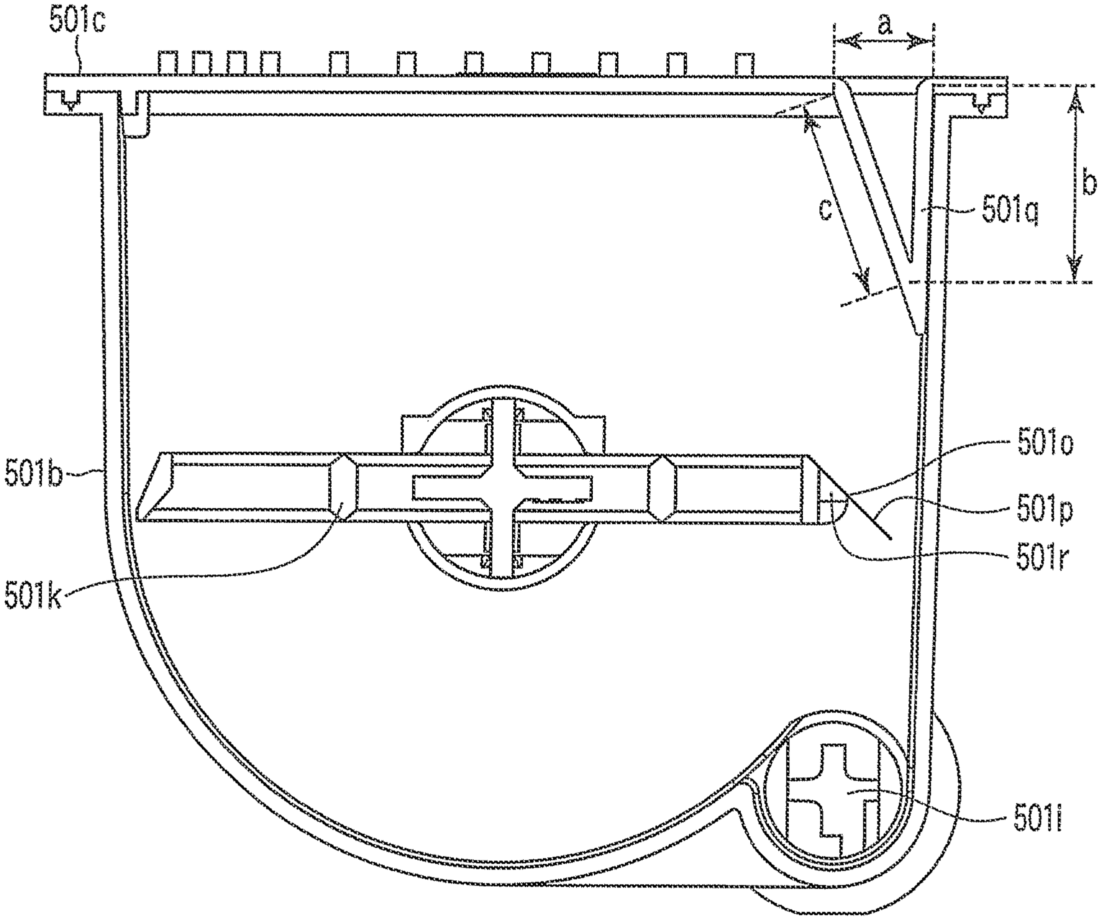
FIG. 5 is a vertical cross-sectional view showing the internal structure of the toner cartridge according to the embodiment.

FIG. 5 shows a cross-sectional view of the first toner cartridge 501 cut along the line II-II in FIG. 3. The lid body 501*c* has a lid body protrusion part 501*q*, which is also shown in FIG. 2. The lid body protrusion part 501*q* is provided at an upper edge of the container body 501*b* when the lid body 501*c* is inserted in the container body 501*b*. The lid body protrusion part 501*q* is a protrusion having a cross-sectional triangle shape enclosed by a line a, a line b, and an oblique line c. The line a has a predetermined length in a width direction from a connection of the lid body 501*c* and the container body 501*b*. The line b has a predetermined length from the connection of the lid body 501*c* and the container body 501*b* to the container body 501*b* and crosses the line a at a substantial right angle. The oblique line c is determined by the above two sides. A plurality of ribs 501*u* are provided in a part of the lid body 501*c* above the lid body protrusion part 501*q*, more specifically, inside a recess formed on an outer surface of the lid body 501*c* corresponding to the lid body protrusion part 501*q*, as shown in FIGS. 2 and 3. In a specific implementation, four ribs 501*u* are provided as shown. The plurality of ribs 501*u* are parallel to each other, and each extends in a plane crossing a longitudinal direction of the lid body 501*c*, that is, extends in a plane crossing a rotational axis of at least one of rotational members, such as the mixer 501*k* and the screw 501*i*.

In addition, a surface enclosed by the line b having a predetermined length of the lid body protrusion part 501*q* and a longitudinal direction of the lid body 501*c* is formed such that the lid body 501*c* abuts the container body 501*b* without having any gap interposed therebetween when the lid body 501*c* is inserted in the container body 501*b*.

When the amount of the toner in the toner cartridge main body 501*a* becomes little, a gap appears between an outer periphery of the mixer 501*k* and an inner wall of the container body 501*b*. Therefore, the toner remaining in the gap cannot be conveyed by the mixer 501*k*. However, in the present embodiment, the lid body protrusion part 501*q* fills the gap appearing in the connection of the container body 501*b* and the lid body 501*c*. Therefore, the toner can be prevented from remaining in the gap.

Further, the lid body protrusion part 501*q* is provided with a surface having the oblique line c. Therefore, the toner adhered to the lid body protrusion part 501*q* easily flows down to an inside bottom of the container body 501*b*, and adherence of the toner hardly occurs.

In addition, as shown in FIG. 5, a sweep sheet 501*o* is fixed on a mounting surface 501*r* which is an outer periphery part of the mixer 501*k*. In addition, a sweep part 501*p*, which is a free end not fixed on the mounting surface 501*r* of the sweep sheet 501*o*, projects in a further extended direction from an outer periphery part of the mixer 501*k*. The mixer 501*k* rotates counterclockwise in FIG. 5 which is a cross-sectional view of the first toner cartridge 501 viewed from a front surface side. For this reason, the sweep part 501*p* abuts the inner bottom of the container body 501*b*.

Further, as shown in FIG. 2, on the mounting surface 501*r* of the mixer 501*k*, there is inserted the sweep sheet 5010 in a longitudinal direction. In addition, a plurality of cut parts 501*x* shown in FIG. 2 are formed on the sweep sheet 501*o* with predetermined intervals for an overall length in a width direction in a direction substantially parallel to a rotational axis.

When a driving force is transmitted from the driving apparatus 700 shown in FIG. 7 to rotationally drive the coupling member 501*j*, the screw 501*i* is rotationally driven in an integrated manner, and the mixer 501*k* is rotationally driven via the mixer gear 5011. In this manner, the mixer 501*k* agitates and sends out the toner to the screw 501*i* at the same time. The screw 501*i* conveys the sent-out toner to the discharging unit 501*g*. Then, the toner is discharged from the discharging unit 501*g*. When the first toner cartridge 501 just starts to be used, the toner amount in the container body 501*b* is large. Even when the mixer 501*k* and the sweep sheet 501*o* rotate in an integrated manner, the toner in contact with the sweep part 501*p* passes through the cut parts 501*x* and flows toward a rear direction of the sweep part 501*p*. Therefore, the sweep sheet 501*o* never interferes with the rotation of the mixer 501*k*.

In addition, when the toner amount of the first toner cartridge 501 becomes small, a gap is formed between the outer periphery part of the mixer 501*k* and the inner wall of the container body 501*b*. Therefore, the toner remaining in the gap cannot be conveyed by the mixer 501*k*. However, the sweep sheet 5010 abuts the inner bottom of the container body 501*b*. Therefore, the toner remaining in the gap can be sent out to the screw 501*i*. In this way, an amount of the remaining toner in the first toner cartridge 501 can be reduced.

Next, a rotational body 501*v* which is an important part of the present embodiment and a periphery thereof will be described by using FIGS. 6 to 9. In addition, a coupling member 501*j* in the first toner cartridge 501, drive of the mixer gear 5011 in association therewith, the driving device 700 for driving the coupling member 501*j* inserted in the copier main body 100, and a method for discriminating a type of the first toner cartridge 501 inserted in the copier main body 100 will be described as well. Here, as the discrimination of a type of the first toner cartridge 501, discrimination of whether the toner cartridge is a genuine product or not will be taken as an example.

Figure 6:
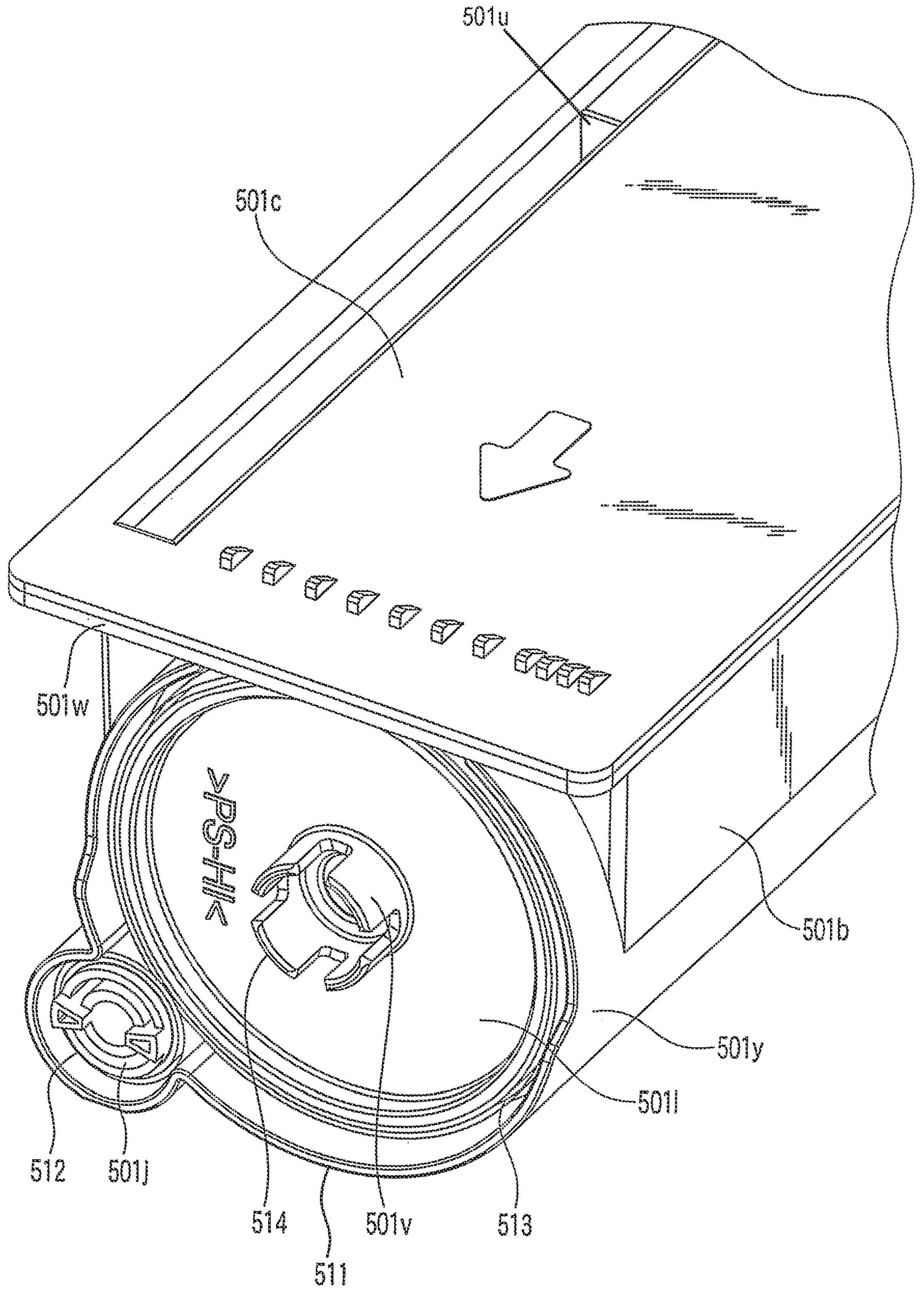
FIG. 6 is an enlarged perspective view of the toner cartridge according to the embodiment as viewed from rear upper side thereof.

FIG. 6 is a perspective view of an entire configuration of the first toner cartridge 501 according to the present embodiment viewed from a rear surface side. In FIG. 6, the coupling member 501*j* to which a rotational force is applied is shown. When the coupling member 501*j* is rotationally driven, the mixer gear 5011 rotates, and the rotational body 501*v* provided coaxially with the mixer gear 5011 rotates.

Figure 8:
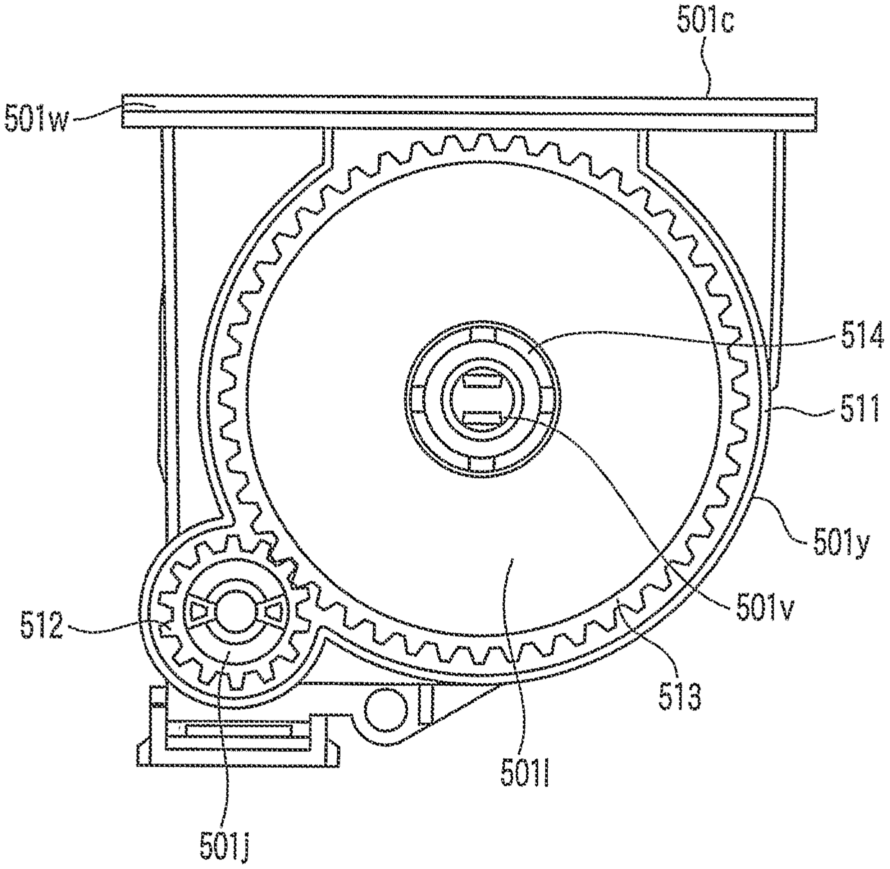
FIG. 8 is a view of the toner cartridge according to the embodiment as viewed from a rear surface thereof.
Figure 9:
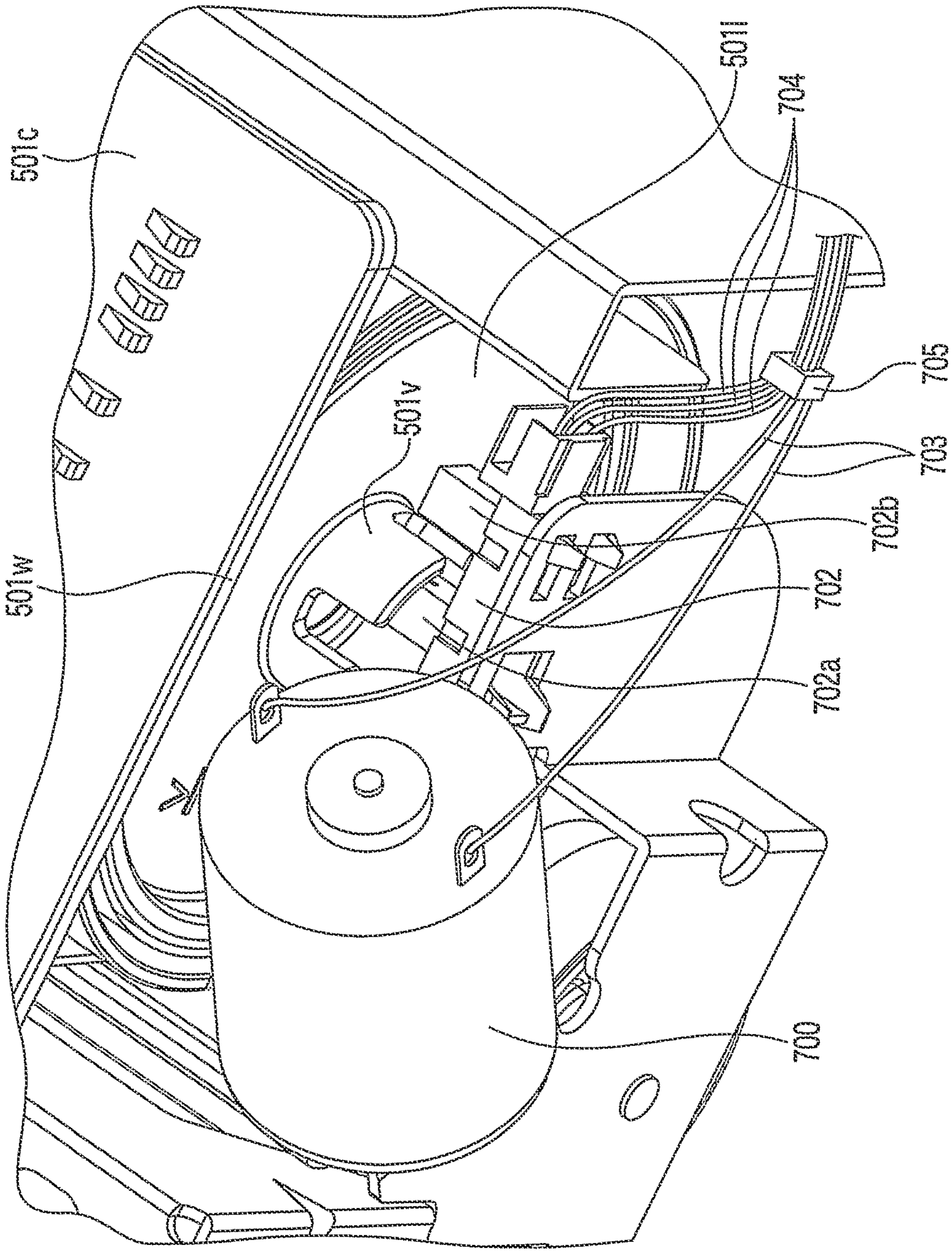
FIG. 9 is an enlarged perspective view of the toner cartridge according to the embodiment as viewed from rear upper side thereof.

FIG. 7 is a perspective view of the driving device 700 for rotating the coupling member 501*j* and an optical detector 702 viewed from a front surface side. In FIG. 7, the driving device 700, a first drive gear 701*b* rotated by the driving device 700, and a second drive gear 701*c* are shown. The first drive gear 701*b* has a drive coupling member 701*a* coaxially. The drive coupling member 701*a* can be connected with the coupling member 501*j*. At this time, a part of the rotational body 501*v* enters between a light emitting element 702*a* and a light receiving element 702*b* of the optical detector 702. FIG. 8 is a view of the first toner cartridge 501 viewed from a rear surface side. FIG. 9 is a perspective view showing a state, in which the coupling member 501*j* of the first toner cartridge 501 is connected with the drive coupling member 701*a* rotationally driven by the driving device 700 via a gear, viewed from a rear surface side. FIG. 8 shows a relationship between the rotational body 501*v* and the light emitting element 702*a* and the light receiving element 702*b*.

Now, the first toner cartridge 501 is inserted in a direction of arrows shown in FIGS. 6 and 7 and inserted in a predetermined slot of a cartridge holding mechanism 505. Center axes of the coupling member 501*j* having a substantial cylindrical shape shown in FIG. 6 and the drive coupling member 701*a* having a substantially cylindrical shape shown in FIG. 7 are positioned coaxially, and face each other. When the mounting of the first toner cartridge 501 is completed, the drive coupling member 701*a* and the coupling member 501*j* fit with each other. For this reason, when the drive coupling member 701*a* rotates, the coupling member 501*j* also rotates at the same rotational speed in accordance therewith.

In addition, on an opposite surface of the surface of the driving coupling member 701*a* which fits with the coupling member 501*j* of the first toner cartridge 501, the first drive gear 701*b* is coupled coaxially. The driving device 700 has the second drive gear 701*c* inserted in a front edge of a rotational axis thereof. Gears formed on outer periphery surfaces of the first drive gear 701*b* and the second drive gear 701*c* mesh with each other such that when the second drive gear 701*c* rotates, the first drive gear 701*b* rotates in accordance therewith.

For the above reason, when the second drive gear 701*c* is rotated by the driving device 700, the drive gear 701*b* rotates in accordance therewith, and the drive coupling member 701*a* coupling with the first drive gear 701*b* also rotates. Further, the coupling member 501*j* of the first toner cartridge 501 fitting with the drive coupling member 701*a* also rotates.

In the first toner cartridge 501, when a driving force of the driving device 700 is transmitted and the coupling member 501*j* is rotationally driven, the screw 501*i* is rotationally driven in an integrated manner. Then, a gear formed on an outer periphery surface of the coupling member 501*j* meshes with a gear formed on an outer periphery surface of the mixer gear 5011, and the mixer gear 5011 is also rotationally driven.

In this manner, the mixer 501*k* agitates toner and also sends out the toner to the screw 501*i*, and the screw 501*i* conveys the conveyed toner to the discharging part 501*g*.

In addition, as shown in FIG. 6, the mixer gear 5011 is coupled with the rotational body 501*v* which is concentric with the mixer gear 5011 and has a cylindrical shape with an outer diameter smaller than the mixer gear 5011. The rotational body 501*v* projects from a surface of the mixer gear 5011 facing outside with respect to the first toner cartridge 501. The rotational body 501*v* is coaxial with the first toner cartridge 501 and has a substantially cylindrical shape with predetermined height in an extending direction.

The rotational body 501*v* has a plurality of slits formed thereon radially with equal intervals from a center axis toward an outer periphery surface, the slits working as light incidence parts. When the mounting of the first toner cartridge 501 is completed, the plurality of slits provided in a height direction parallel to an axis of the rotational body 501*v* only need to be inserted deep enough not to interfere with the light receiving element 702*b* (for example, photodiode) receiving light emitted from the light emitting element 702*a* (for example, light emitting diode) described later.

As shown in FIGS. 7 and 9, the optical detector 702 is inserted in the copier main body 100. The optical detector 702 includes the light emitting element 702*a* and the light receiving element 702*b* (the light emitting element may be 702*b* and the light receiving element may be 702*c*). The light emitting element 702*a* and the light receiving element 702*b* face each other with a predetermined interval interposed therebetween.

The light emitting element 702*a* may be any element which emits visible light and infrared light. In addition, as the optical detector 702, a detector using laser may be used.

When the mounting of the first toner cartridge 501 is completed, the light emitting element 702*a* is arranged such that the light emitting element 702*a* is positioned, for example, on a center axis of the rotational body 501*v*, and does not contact the inside of the rotational body 501*v*. In addition, the light receiving element 702*b* is positioned to sandwich a part of the rotational body 501*v* with the light emitting element 702*a*, that is, the light receiving element 702*b* is positioned at an outer periphery side of the rotational body 501*v*. The light receiving element 702*b* receives light from the light emitting element 702*a*.

Here, a rotational speed of the coupling member 501*j* and a rotational speed of the mixer gear 5011 are not identical since outer diameters thereof are different. The screw 501*i* needs to rotate fast since the screw 501*i* has to convey the toner to the discharging part 501*g* sequentially. Agitation of the toner by the mixer 501*k* needs to be carried out slowly in order to prevent stress to the toner and attaching of the toner to inner walls of the container body 501*b* and the lid body 501*c*. Therefore, a rotational speed of the mixer 501*k* is slower than a rotational speed of the screw 501*i*. In other words, the rotational speed of the mixer gear 5011 connected to the mixer 501*k* is slower than the rotational speed of the coupling member 501*j* connected to the screw 501*i*. That is, an outer diameter of the mixer gear 5011 which meshes with the coupling member 501*j* and rotates is larger than an outer diameter of the coupling member 501*j*.

For this reason, a rotational speed of the rotational body 501*v* coupled with the mixer 501*k* is similarly slower than the rotational speed of the coupling member 501*j*. In the present embodiment, a gear ratio is 1:3.7, therefore, the mixer gear 5011 is 3.7 times slower than the coupling member 501*j*.

The rotational speed of the mixer 501*k* (and the rotational body 501*v*) cannot be made fast due to the reason described above. Still, time required for detection of the rotational body 501*v* needs to be short. This is because, if the time required for the detection of the rotational body 501*v* is long, the screw 501*i* rotates 3.7 times as much as the mixer 501*k* rotates, and the toner of an amount more than necessary is supplied to the discharging part 501*g* during the detection. Supplying the toner more than necessary causes reduction in image quality. For such a reason, in the present embodiment, the number of the slits formed on the rotational body 501*v* is devised in order to carry out the accurate detection by the optical detector 702 in a short period of time.

For example, the rotational speed of the coupling member 501*j* and the rotational speed of the mixer gear 5011 are not taken into consideration, and the slits with an appropriate open angle are assumed to be provided at two positions on the rotational body 501*v* with equal intervals with respect to 360 degrees per cycle. Since the rotational speed of the mixer gear 5011 is slow and the interval between the slits is large, time of the detection by the optical detector 702 becomes long. If the time of the detection attempts to be made shorter on the contrary, the optical detector 702 lacks accuracy of the detection.

For the above reason, in order to ensure the detection with high accuracy, the number of the slits appropriate for narrowing the interval between the slits needs to be determined. Then, by a ratio of rotational speeds between the rotational speed of the coupling member 501*j* and the rotational speed of the mixer gear 5011, the appropriate number of the slits can be determined. The rotational speed of the coupling member 501*j* is assumed to be R1 (rad/s), and the rotational speed of the mixer gear 5011 is assumed to be R2 (rad/s) When a ratio of both of the rotational speeds is K=R2/R1, only 1/K or more of the slits need to be formed on the rotational body 501*v*. In the present embodiment, a ratio between the rotational speed R1 of the coupling member 501*j* and the rotational speed R2 of the mixer gear 5011 is 3.7:1. Therefore, in the present embodiment, 3.7 is rounded up, and a case where four of the slits are formed is shown. By configuring the rotational body 501*v* as described above, the detection of rotation of the rotational body 501*v* can surely be carried out during one rotation of the coupling member 501*j*.

As shown in FIGS. 6, 8, and 9, on an outer periphery surface of the rotational body 501*v*, the slits are formed at four positions with equal intervals with respect to 360 degrees per cycle. The open angle of the slits is, for example, 30 degrees. Here, shapes of the coupling members 501*j*, the mixer gear 5011, and the rotational body 501*v* are all the same among the first to the fourth toner cartridges 501, 502, 503, and 504 for four colors.

When the first toner cartridge 501 is inserted in a predetermined position of the copier main body 100, the driving device 700 rotates the second drive gear 701*c*, the gears formed on the outer periphery surfaces mesh with each other, the first drive gear 701*b* rotates, and the drive coupling member 701*a* coupled with the first drive gear 701*b* also rotates. Then, the coupling member 501*j* of the first toner cartridge 501 fitting with the drive coupling member 701*a* also rotates. Together therewith, since the gear formed on the outer periphery surface of the coupling member 501*j* and the gear formed on the outer periphery surface of the mixer gear 5011 mesh with each other, the mixer gear 5011 is also rotationally driven. Then, the rotational body 501*v* with the plurality of slits formed thereon which is coupled with the mixer gear 5011 also rotates.

In addition, as shown in FIG. 9, the light emitting element 702*a* is housed so as not to contact the inside of the rotational body 501*v*. The light receiving element 702*b* is positioned so as to sandwich the rotational body 501*v* with the light emitting element 702*a*, that is, on an outer periphery of the rotational body 501*v*.

Since the plurality of slits are formed on the outer periphery surface of the rotational body 501*v*, when the rotational body 501*v* rotates, there are a case where the light receiving element 702*b* cannot receive light from the light emitting element 702*a* due to the rotational body 501*v* and a case where the light receiving element 702*b* can receive the light since the light passes through the slit of the rotational body 501*v*. The optical detector 702 supplies to a controlling unit (not shown) a signal whose level changes depending on the light receiving of the light receiving element 702*b* in sync with light shielding of the light from the light emitting element 702*a* due to rotation of the mixer gear 5011.

The optical detector 702 outputs to the controlling unit a signal H when the light receiving element 702*b* does not receive light from the light emitting element 702*a*, and a signal L when the light receiving element 702*b* receives light from the light emitting element 702*a*. In the present embodiment, on the outer periphery surface of the rotational body 501*v*, the slits each having 30 degrees are formed at four positions with equal intervals with respect to 360 degrees per cycle.

Figure 10:
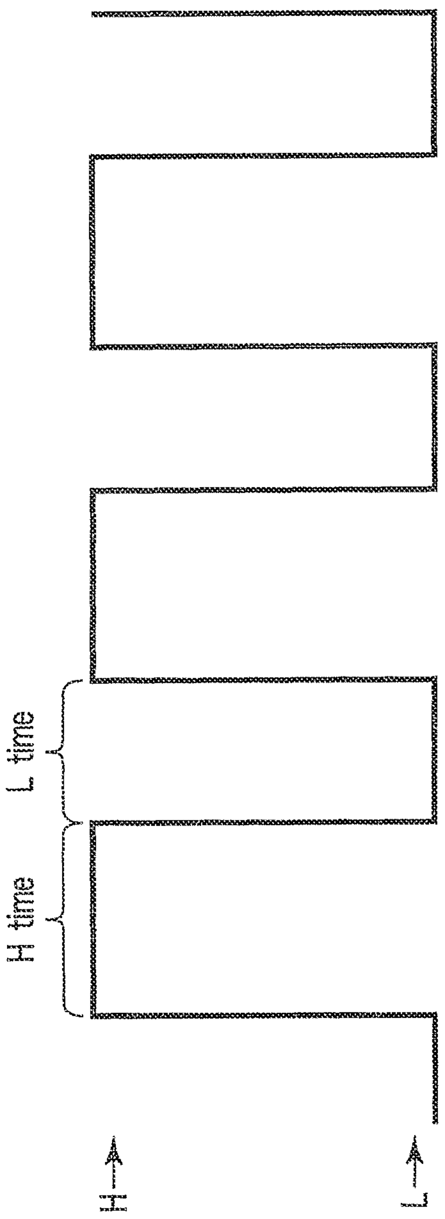
FIG. 10 is a view showing a detection waveform of an optical detecting apparatus according to the embodiment.

A change of the signals H and L output to the controlling unit from the optical detector 702 is in sync with rotation of the rotational body 501*v* and in a waveform shown in FIG. 10. Here, output time when the optical detector 702 outputs to the controlling unit the signal H is H time, and output time when the optical detector 702 outputs the signal L is L time.

In addition, since the slits each having 30 degrees are formed on the outer periphery surface of the rotational body 501*v* with equal intervals with respect to 360 degrees per cycle in an ideal condition, L time/H time=0.5 is obtained. Here, in consideration of a little detection error near boundaries between positions where the slits are formed and where the slits are not formed on the rotational body 501*v*, if L time/H time=0.2 to 0.8 is obtained, the controlling unit determines that the first toner cartridge 501 inserted in the copier main body 100 is a genuine product. If L time/H time is not within 0.2 to 0.8, the controlling device determines that the first toner cartridge 501 inserted in the copier main body 100 is not a genuine product.

Figure 11:
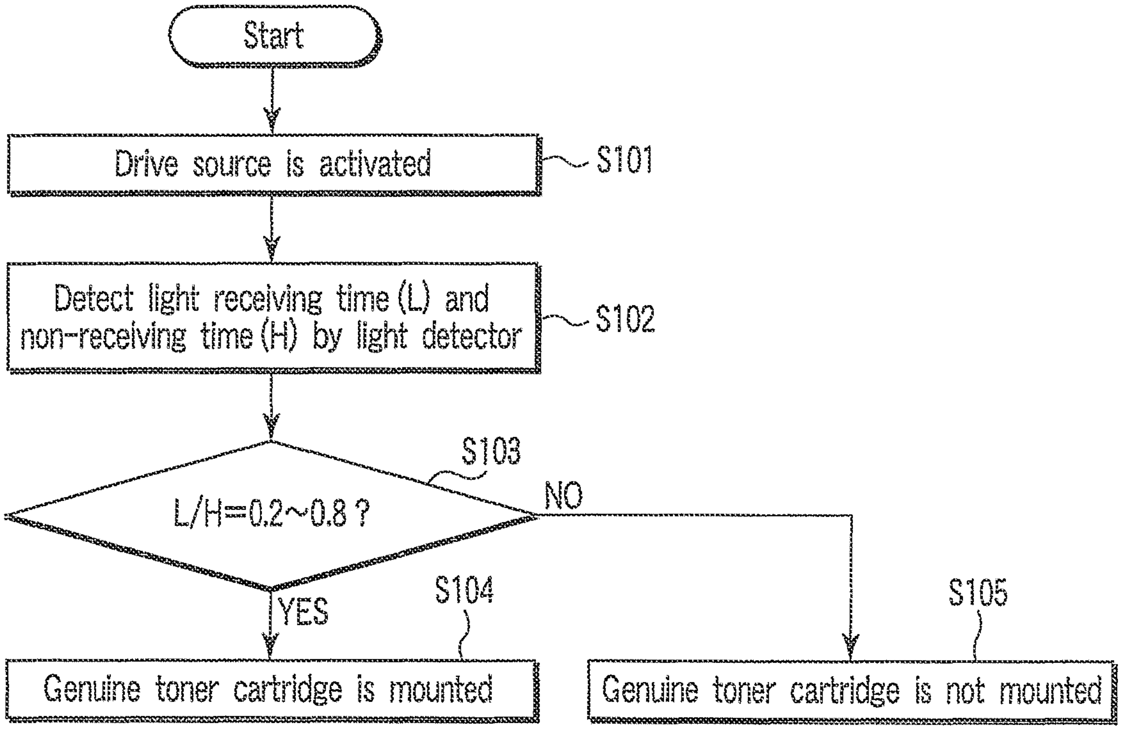
FIG. 11 is a flowchart showing a detecting method of the optical detecting apparatus according to the embodiment.

FIG. 11 is a flowchart showing the determination of the optical detector 702 whether the first toner cartridge 501 inserted in the copier main body 100 is a genuine product or not (S101).

When a driving device 700*b* is activated, the rotational body 501*v* rotates via the second drive gear 701*c*, the first drive gear 701*b*, the drive coupling member 701*a*, and the mixer gear 5011.

The optical detector 702 outputs to the controlling unit the signal H when the light receiving element 702*b* does not receive light from the light emitting element 702*a*, and the signal L when the light receiving element 702*b* receives light from the light emitting element 702*a*. Then, the controlling unit detects the output time when the optical detector 702 outputs the signal H to the controlling unit as the H time and the output time when the optical detector 702 outputs the signal L as the L time (S102).

At this time, when L time/H time=0.2 to 0.8 is obtained (S103, YES), the controlling unit determines that the first toner cartridge 501 inserted in the copier main body 100 is a genuine product (S104).

If L time/H time is not within 0.2 to 0.8 (S103, NO), then the controlling unit determines that the first toner cartridge 501 is not inserted in the copier main body 100, or the first toner cartridge 501 is not a genuine product (S105).

The controlling unit displays on the control panel 300 a result of the determination of whether the first toner cartridge 501 inserted in the copier main body 100 is a genuine product or not to notify the user thereof, and can also ask for attention.

As described above, in the present embodiment, a type of the first toner cartridge 501 can be discriminated accurately in a short period of time by a shape of the slit of the rotational body 501*v*. Although needless to say, the discrimination of a type of the first toner cartridge 501 can be changed to discrimination of a color, a destination, or others.

In the first toner cartridge 501 according to the present invention, a configuration of using the rotational body 501*v* and the optical detector 702 is not limited to the embodiment such as above. For example, the rotational body 501*v* may be a rotational body having a drum shape, and a reflecting part as a light incident part and a non-reflecting part may be formed with equal intervals on an outer periphery surface thereof. Then, the configuration may be such that, from the outside of the rotational body, light is irradiated from the light emitting element to the outer periphery surface of the rotational body, and the light reflected by the reflecting part is received by the light receiving element.

In addition, the rotational body 501*v* may also be provided to move in association with the mixer gear 5011, in addition to being arranged coaxially with the mixer gear 5011.

Next, a gear cover 501*y* which is an important part of the present embodiment will be described by using FIGS. 6 to 9. As shown in FIG. 9, by providing the optical detector 702 described above, a lead wire 704 for supplying power to the optical detector 702 and transmitting a signal to the control unit from the optical detector 702 exists, in addition to a lead wire 703 for supplying power to the driving source 700. A lead wire holder 705 bundles the lead wire 703 and the lead wire 704.

FIG. 8 is a rear surface view of the toner cartridge main body 501*a*. As shown in FIG. 8, outer periphery surfaces of the coupling member 501*j* and the mixer gear 5011 have a cut gear, and mesh with each other. An outer periphery surface of the rotational body 501*v* has slits at a plurality of positions.

The lead wire 703 and the lead wire 704 are positioned near the coupling member 501*j*, the mixer gear 5011, and the rotational body 501*v* in a floatable manner. For this reason, in order to prevent the coupling member 501*j*, the mixer gear 5011, and the rotational body 501*v* from entangling the lead wire 703 and the lead wire 704, the gear cover 501*y* shown in FIGS. 6 and 8 is provided.

The gear cover 501*y* is formed so as to surround an outer periphery of the coupling member 501*j* and the mixer gear 5011 on a front surface side of the first toner cartridge 501.

A part of the gear cover 501*y* surrounding the outer periphery of the coupling member 501*j* with almost the same curvature as that of the coupling member 501*j* is formed as described below. When the center of the coupling member 501*j* is set as a reference point, an outer edge 511 of the gear cover 501*y* is formed on the same position as, or distant from an outer edge 512 of the coupling member 501*j* toward an extending direction from the first toner cartridge 501.

A part of the gear cover 501*y* surrounding the of periphery of the mixer gear 5011 with almost the same curvature as that of the mixer gear 5011 is formed as described below. When the center of the mixer gear 5011 is set as a reference point, the outer edge 511 of the gear cover 501*y* is formed on the same position as, or distant from an outer edge 513 of the mixer gear 5011 toward an extending direction from the first toner cartridge 501.

On the premise of the gear cover 501*y* surrounding the outer peripheries of the coupling member 501 and the mixer gear 5011 under the above conditions, the following is formed. When the center of the rotational body 501*v* having a cylindrical shape is set as a reference point, at least a part of the outer edge 511 of the gear cover 501*y* is formed on the same position as, or distant from an outer edge 514 of the rotational body 501*v* toward an extending direction from the first toner cartridge 501.

As a matter of course, when the center of the rotational body 501*v* having a cylindrical shape is set as a reference point, all part of the outer edge 511 of the gear cover 501*y* may be formed on the same position as, or distant from an outer edge 514 of the rotational body 501*v* toward an extending direction from the first toner cartridge 501.

By providing the gear cover 501*y*, the lead wire 703 and the lead wire 704 are never placed close to the coupling member 501*j*, the mixer gear 5011, and the rotational body 501*v*, and entanglement can be prevented. In addition, the user can prevent hurting himself or herself while operation of exchanging the first toner cartridge 501, etc. since the coupling member 501*j*, the mixer gear 5011, and the rotational body 501*v* are covered by the gear cover 501*y*.

Further, the lead wire 703 and the lead wire 704 are made abutting the outer edge 511 of the gear cover 501*y*, thereby the lead wire 703 and the lead wire 704 do not float, and entanglement can be further prevented.

Here, a cartridge exterior surface part 501*w* formed by coupling the lid body 501*c* and the container 501*b* of the first toner cartridge 501 is shown in FIGS. 6, 8, and 9. The cartridge exterior surface part 501*w* is an outer periphery surface of the lid body 501*c* and the container 501*b* coupled together on a side where the mixer gear 5011 is connected on the first toner cartridge 501. When the lid body 501*c* and the container 501*b* are coupled, an outer edge of the lid body 501*c* and an outer edge of the container 501*b* facing each other have the same shape and the same size. For this reason, the cartridge exterior surface part 501*w* is a flat surface without irregularities.

When the center of the rotational body 501*v* having a cylindrical shape is set as a reference point, the cartridge exterior surface part 501*w* is formed on the same position as, or distant from an outer edge 514 of the rotational body 501*v* toward an extending direction from the first toner cartridge 501.

Then, when the center of the rotational body 501*v* having a cylindrical shape is set as a reference point, the cartridge exterior surface part 501*w* is formed to have the same positional relationship with a furthest position in the outer edge 511 of the gear cover 501*y* toward an extending direction from the first toner cartridge 501. Therefore, a plane including a part at a furthest position toward an extending direction from the first toner cartridge 501 and the cartridge exterior surface part 501*w* in the outer edge 511 of the gear cover 501*y* is in a perpendicular relationship with respect to the first toner cartridge 501.

For this reason, the first toner cartridge 501 can be raised easily by having the gear cover 501*y* at the bottom.

In addition, when the center of the rotational body 501*v* having a cylindrical shape is set as a reference point, a part in the outer edge 511 of the gear cover 501*y* at a furthest position toward an extending direction from the first toner cartridge 501 may be set further than a surface of the cartridge exterior surface part 501*w*. In this case, in order that the plane including the outer edge 511 of the gear cover 501*y* is in a perpendicular relationship with respect to the first toner cartridge 501, when the center of the rotational body 501*v* having a cylindrical shape is set as a reference point, all of the outer edge 511 of the gear cover 501*y* can be formed to have the same position toward an extending direction from the first toner cartridge 501. In this manner, the first toner cartridge 501 can be raised easily by having the gear cover 501*y* at the bottom.

Further, when the center of the rotational body 501*v* having a cylindrical shape is set as a reference point, the outer edge 511 of the gear cover 501*y* may be formed to have a plurality of parts which are at a furthest position toward an extending direction from the first toner cartridge 501. In this case, the number of the plurality of parts is determined such that the first toner cartridge 501 can be raised by having, the gear cover 501*y* at the bottom.

As described above, the first toner cartridge 501 can easily be raised by having the gear cover 501*y* at the bottom. Therefore, the first toner cartridge 501 can easily be made at a standstill by having a surface having a filling opening 501*m* for filling the toner as the top surface.

Therefore, when the first toner cartridge 501 is replenished with the toner, the replenishment of the toner can be carried out without requiring a special effort or a apparatus for holding the first toner cartridge 501.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A toner cartridge comprising:

a container configured to contain toner, the container having a longitudinal direction and a width direction which is perpendicular to the longitudinal direction; and a lid body provided on the container, a part of the lid body including a protrusion having an oblique surface facing inside of the container, the protrusion abutting the container along with the width direction.

2. The toner cartridge according to claim 1, wherein the lid body has a rectangular plate shape.

3. The toner cartridge according to claim 1, further comprising:

an agitating member configured to agitate the toner in the container.

4. The toner cartridge according to claim 1, further comprising:

a toner supplying opening formed in the container.

5. The toner cartridge according to claim 4, further comprising:

a conveying member configured to convey the toner toward the toner supplying opening.

6. The toner cartridge according to claim 1, wherein the protrusion has a straight part and the straight part abuts the container.

7. The toner cartridge according to claim 1, wherein the protrusion is located at an upper edge of the container.

8. The toner cartridge according to claim 1, wherein the container has a U-shaped cross section.

9. The toner cartridge according to claim 8, wherein the protrusion is located at an upper edge of the U-shaped cross section of the container.

10. The toner cartridge according to claim 1, wherein a front side of the protrusion abuts the container.

11. The toner cartridge according to claim 10, wherein the front side of the protrusion abuts an inner side of a front wall of the container.

12. The toner cartridge according to claim 10, wherein the lid body has a flat part connecting to the protrusion at the front side.

* * * * *